(12) United States Patent
Ishida et al.

(10) Patent No.: US 7,266,608 B2
(45) Date of Patent: Sep. 4, 2007

(54) SYSTEM FOR PUNCTUALLY SENDING AND RECEIVING SERIAL DATA AND A METHOD FOR SENDING AND RECEIVING THE SERIAL DATA

(75) Inventors: Hitoshi Ishida, Tokyo (JP); Minoru Shiga, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 203 days.

(21) Appl. No.: 09/764,299

(22) Filed: Jan. 19, 2001

(65) Prior Publication Data

US 2001/0056514 A1    Dec. 27, 2001

(30) Foreign Application Priority Data

Jan. 20, 2000    (JP) ............................. 2000-011516
May 11, 2000    (JP) ............................. 2000-138073

(51) Int. Cl.
*G06F 15/16*    (2006.01)
(52) U.S. Cl. ...................... 709/227; 709/208; 709/209; 709/248; 714/748; 714/749; 714/750
(58) Field of Classification Search ................ 709/227, 709/208, 209, 248; 714/748, 749
See application file for complete search history.

(56) References Cited

U.S. PATENT DOCUMENTS

| | | | | | |
|---|---|---|---|---|---|
| 4,363,093 | A | * | 12/1982 | Davis et al. ................. | 709/227 |
| 4,829,297 | A | * | 5/1989 | Ilg et al. .................... | 370/449 |
| 5,297,144 | A | * | 3/1994 | Gilbert et al. .............. | 370/436 |
| 5,694,543 | A | * | 12/1997 | Inoue ........................... | 714/4 |
| 6,006,017 | A | * | 12/1999 | Joshi et al. ................. | 709/224 |
| 6,192,417 | B1 | * | 2/2001 | Block et al. ................ | 709/249 |
| 6,275,500 | B1 | * | 8/2001 | Callaway et al. ........... | 370/449 |
| 6,351,769 | B1 | * | 2/2002 | King et al. .................. | 709/224 |
| 6,374,293 | B1 | * | 4/2002 | Dev et al. .................... | 709/220 |

FOREIGN PATENT DOCUMENTS

JP    63-221734    9/1988

(Continued)

*Primary Examiner*—Ario Etienne
*Assistant Examiner*—Barbara Burgess
(74) *Attorney, Agent, or Firm*—Birch, Stewart, Kolasch & Birch, LLP

(57) ABSTRACT

This invention provides an apparatus for sending and receiving serial data without losing the real time characteristics even in case of a plurality of errors. According to this invention, an overhead of the communication can be reduced, and the time for the communication can be reduced.

In a system for sending and receiving serial data between a primary station and a secondary station by sending a polling request and a refresh request through a serial transmission bus in determined time, the primary station retries a polling request and a refresh request to the secondary station which has not responded normally in the same determined time after sending the polling request and the refresh request.

Further, in a system which includes the primary station for sending the polling request and the refresh request through the serial transmission bus within the determined time and a plurality of secondary stations for responding to the primary station, the primary station predetermines a response order from the secondary stations, and sends the polling request and the refresh request to the secondary stations without designating an address. Each of the secondary stations checks the predetermined order, and responds accordingly.

34 Claims, 22 Drawing Sheets

FOREIGN PATENT DOCUMENTS

| | | |
|---|---|---|
| JP | 63-285040 | 11/1988 |
| JP | 01-122231 | 5/1989 |
| JP | 1-300643 A | 12/1989 |
| JP | 01-303942 | 12/1989 |
| JP | 03-182198 | 8/1991 |
| JP | A4-100441 | 2/1992 |
| JP | 08-033070 | 2/1996 |
| JP | 9-181752 A | 7/1997 |
| JP | 11-046161 | 2/1999 |
| JP | 11-196041 | 7/1999 |

* cited by examiner

| 31 | | | 0 | |
|---|---|---|---|---|
| cont1 | address | | status | 41 |
| | | | | |
| | | | | |
| cont1 | address | cont2 | status | 42 |
| data4 | data3 | data2 | data1 | |
| data8 | data7 | data6 | data5 | |
| cont1 | address | cont2 | status | 43 |
| data4 | data3 | data2 | data1 | |
| data8 | data7 | data6 | data5 | |
| cont1 | address | cont2 | status | 44 |
| data4 | data3 | data2 | data1 | |
| data8 | data7 | data6 | data5 | |
| cont1 | address | cont2 | status | 45 |
| data4 | data3 | data2 | data1 | |
| data8 | data7 | data6 | data5 | |
| | | | 0xff | 46 |
| | | | | |
| | | | | |

Fig. 9

| HEXADECIMAL NOTATION | 4B CODE | 5B CODE |
|---|---|---|
| 0 | 0000 | 11110 |
| 1 | 0001 | 01001 |
| 2 | 0010 | 10100 |
| 3 | 0011 | 10101 |
| 4 | 0100 | 01010 |
| 5 | 0101 | 01011 |
| 6 | 0110 | 01110 |
| 7 | 0111 | 01111 |
| 8 | 1000 | 10010 |
| 9 | 1001 | 10011 |
| A | 1010 | 10110 |
| B | 1011 | 10111 |
| C | 1100 | 11010 |
| D | 1101 | 11011 |

(TIMING CHART)

(FRAME CONFIGURATION)

SYSTEM FOR PUNCTUALLY SENDING AND RECEIVING SERIAL DATA AND A METHOD FOR SENDING AND RECEIVING THE SERIAL DATA

BACKGROUND OF THE INVENTION

1. Field of the Invention

This invention relates to serial communications applied to process automations, etc. Particularly, this invention relates to a retry communication in case of an error. This invention also relates to a reduction in response time.

2. Description of the Related Art

In the process automations, a serial transmission bus is used as an interface for connecting a field apparatus and a monitor controller.

FIG. 1 shows a configuration chart of a general serial communication system. In FIG. 1, a primary station 11, secondary stations 12–15, and a serial transmission bus 16 for connecting each of the stations are illustrated. For example, the secondary stations 12 and 15 are in an input type, and the secondary stations 13 and 14 are in an output type.

According to the related art, a sequential polling system for collecting data of a secondary station by polling and collecting data of another secondary station also by polling is generally applied to a system in which the primary station and a plurality of secondary stations are connected through a serial communication bus. HDLC (High-Level Data Link Control) is an example of the serial polling system. A chart for explaining communication timing of the HDLC is illustrated in FIG. 22, and a configuration chart of a frame defined in the HDLC (JIS-X5104-1991) is illustrated in FIG. 23. A block configuration chart of the primary station is illustrated in FIG. 24. In FIG. 22, a refresh request 1201 from the primary station to the secondary station 13, a refresh response 1202 from the secondary station 13, a refresh request 1203 from the primary station to the secondary station 14, a refresh response 1204 from the secondary station 14, a polling request 1205 from the primary station to the secondary station 12, a polling response 1206 from the secondary station 12, a polling request 1207 from the primary station to the secondary station 15, a polling response 1208 from the secondary station 15, and off time 1209 and 1210 between a request and a response are illustrated.

In FIG. 23, a respective frame 1300 of a request from the primary station and a response from the secondary station, a flag 1301 for indicating a start of the frame, an address 1302 for indicating a destination of transmission, a control 1303 for indicating a frame control, transmission data 1304, a frame check sequence (FCS) 1305 for checking the correctness of the frame, and a flag 1306 for indicating an end of the frame are illustrated.

In FIG. 24, a communication circuit 1401, a processor 1402, a memory 1403, an instruction 1404 for starting a communication, and an interrupt signal 1405 are also illustrated.

Operations are explained.

The processor 1402 in the primary station 11 prepares the frame 1300 for transmitting the refresh request 1201 and the polling request 1205, and instructs the communication circuit 1401 to start a communication (1404). Then, the communication circuit 1401 performs the communication as illustrated in FIG. 25, based on a configuration of transmitting data. When the communication is ended, the communication circuit 1401 notifies the processor 1402 by sending the interrupt signal 1405.

However, according to the serial polling system, when a number of the secondary stations increases, longer time is required for collecting data of all the secondary stations. For solving such problems, a following system for collecting data is proposed in a public gazette.

As a second related art, a following system is disclosed in Japanese Unexamined Published Patent Application Hei 1-300643. Hei 1-300643 discloses a polling-selecting system. A primary station sends a polling signal including transmission order information to a plurality of secondary stations, and the secondary stations monitor a carrier signal in a data transmission line. When the signal from the primary station is off, the secondary stations transmit data in a pre-stored transmission order.

As a third related art, Japanese Unexamined Published Patent Application Hei 9-181752 discloses a following system. In Hei 9-181752, a primary station sends a polling packet including a transmission order of each of the secondary stations, and each of the secondary stations sends data after waiting for a period based on the transmission order in the polling packet.

FIG. 25 illustrates a request and a response retried in case of an error in a serial data collection system according a polling system of the related art. In FIG. 25, a refresh request 901 includes polling requests 911, 913, etc. from a primary station and responses 912, 914, etc. from a secondary station. A response which is not normal is marked with an x. In FIG. 25, polling requests 913 and 923 and responses 914 and 924 from the secondary station are also illustrated. According to the related art, the HDLC has been often used in the serial transmission bus. The HDLC functions well in normal operations. However, when especially a plurality of errors occurs, the request and the response are retried respectively for the plurality of errors. Hence, an overhead of a communication is large, and it becomes difficult to realize real time characteristics of communications.

FIG. 23 illustrates contents described in JIS-X5104-1991 (a frame configuration of a procedure for controlling a high-level data link). Since a data length sent from a respective secondary station is not restricted, there is a possibility that the data length becomes quite long. Further, when the primary station polls each of the secondary stations in an error and retries transmission, the overhead of the communication becomes large, and it becomes impossible to collect data within a cycle.

Further, there is an restriction in the process automation system. A plurality of primary stations is connected to a central processor via a network, and each of the primary stations is connected to a large number of secondary stations. Therefore, since a time relation of 100 inputs must be controlled clearly in the real time, each of the primary stations performs time stamp processing and sends data to the central processor. The primary stations have to end the communication with all the secondary stations within the cycle for performing the time stamp processing.

A basic configuration is generally known and disclosed in a system of Japanese Unexamined Published Patent Application Hei 4-100411 as a fourth related art, and an apparatus of Japanese Unexamined Published Patent Application Hei 9-307575 also as the fourth related art, etc. However, the consistency between retrying in a plurality of times due to an error and maintaining the real time characteristics is not described.

In a system of Japanese Unexamined Published Patent Application Hei 9 181752, etc., a request retried by simultaneous polling is disclosed. However, only inquiry time from the primary station is shortened, and the real time characteristics are not considered.

SUMMARY OF THE INVENTION

Basically, a respective state or respective data are requested in polling. If a plurality of secondary stations is in an error, a request must be retried to each of the plurality of secondary stations for determining the data. However, in a system in which the real time characteristics are required in collecting data in a cycle, if the request is retried to the respective secondary station in case of a plurality of complicated errors, it is impossible to end the processing within the cycle.

According to the related art, the consistency of occurrence of the plurality of errors and the real time characteristics is not considered.

In the fourth related art, a retry is performed in next cycle, and a refresh transmission is performed regularly. However, the fourth related art doesn't disclose an idea of retrying a request only to a secondary station in an error in a cycle for maintaining the real time characteristics.

As stated, the overhead of the communication of the primary station is large in the polling system, and if the communication is tried for all the secondary stations within the cycle, the real time characteristics are unable to be realized in case of the plurality of errors.

According to the related art, even in the simultaneous polling method of the second and third related art, addresses of all the secondary stations, from which data are collected, are sent in each polling. Therefore, an overhead of an address communication is large, and time for the communication becomes longer.

It is one of objects of this invention to obtain an apparatus for sending and receiving serial data without losing the real time characteristics in case of a plurality of errors. The apparatus solves the above-stated problems.

It is another object of this invention to provide a serial communication system in which an overhead of a data communication can be reduced. In such system, a communication cycle can be shortened or an inquiry can made in more frequent cycles.

According to an aspect of this invention, a system for sending and receiving serial data includes a plurality of secondary stations for receiving a refresh request and for sending one of data and a response to a primary station and the primary station for sending the refresh request and a polling request asking for sending data and for retrying one of the polling request and the refresh request within the same determined time in case of failure of receiving one of the data and the response.

According to another aspect of this invention, a system for sending and receiving serial data includes a primary station for sending a refresh request and a polling request in a specific order without having each secondary station address in determined time and a plurality of secondary stations for responding to the primary station, following to the specific order.

According to another aspect of this invention, a method for sending and receiving serial data having a plurality of secondary stations receiving a refresh request from a primary station and sending data to the primary station responding to a polling request includes retrying for sending one of the refresh request and the polling request to the secondary station within the same determined time in case of failure of receiving a response.

Further features and applications of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Other objects features, and advantages of the invention will be to apparent from the following description when taken in conjunction with the accompany drawings.

BRIEF DESCRIPTION OF THE DRAWINGS

FIG. 9 illustrates a correspondence of codes in Embodiment 4;

DETAILED DESCRIPTION OF THE PREFERRED EMBODIMENTS

Embodiment 1.

Figure 1:
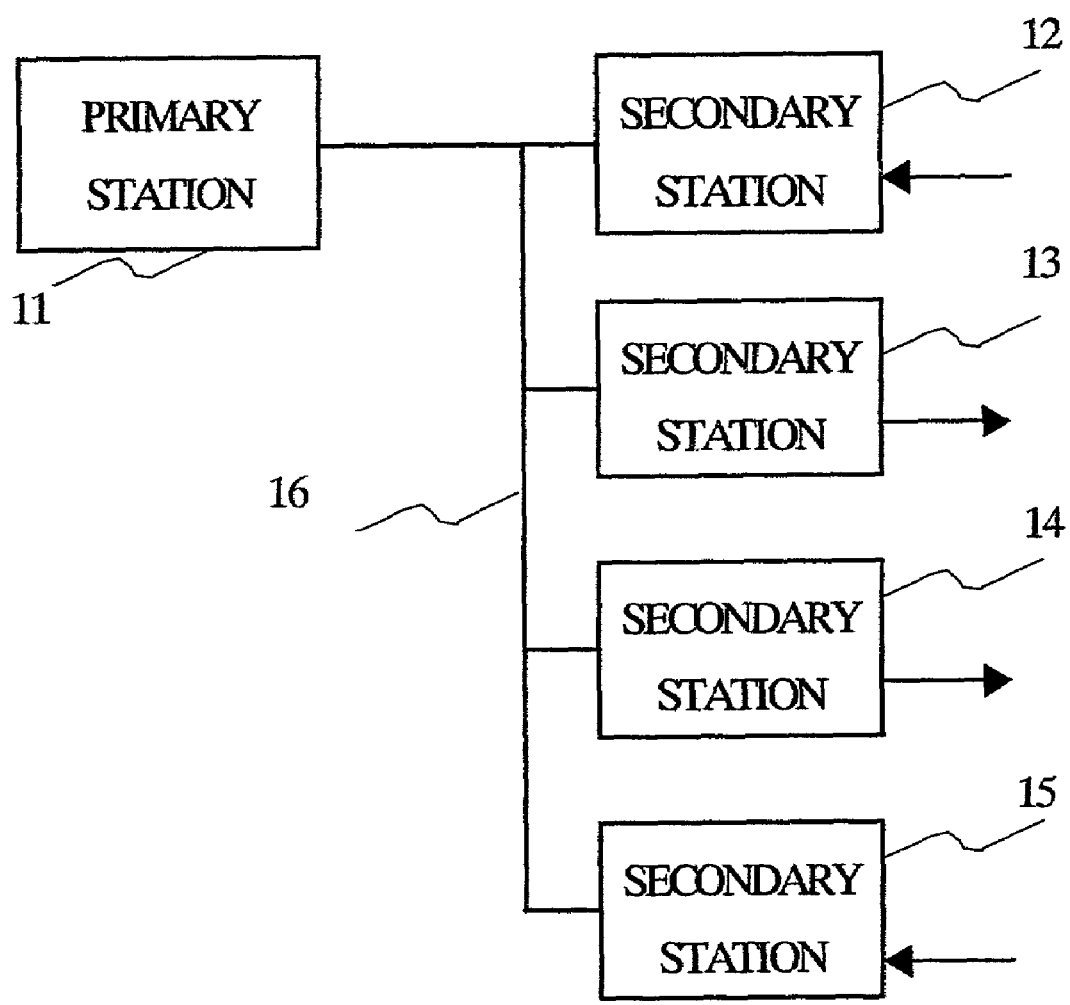
FIG. 1 shows a configuration chart of a system for sending and receiving serial data.

A system configuration chart in Embodiment 1 similar to a general system configuration chart is illustrated in FIG. 1. A mechanism for sending polling from the primary station, which is different from a general system, is essential in this embodiment. Explanations are made on operations with a focus on the real time characteristics of this invention.

Figure 2A:
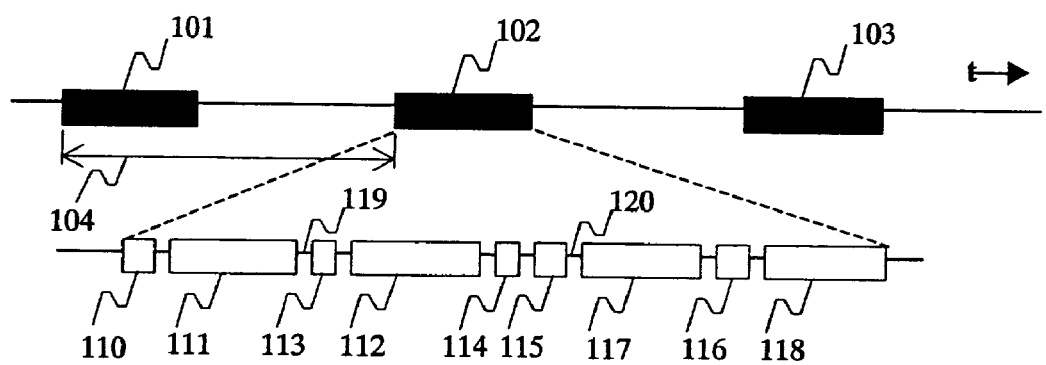
FIG. 2(A) illustrates a chart for explaining data transmission timing of an apparatus for sending and receiving serial data.
Figure 2:
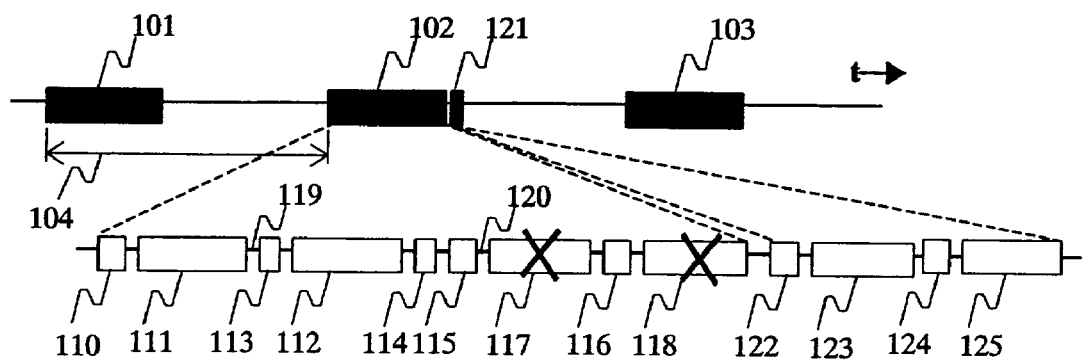
FIG. 2(B) illustrates a chart for explaining retry transmission timing of an apparatus for sending and receiving serial data in Embodiment 1 of this invention.
Figure 3:
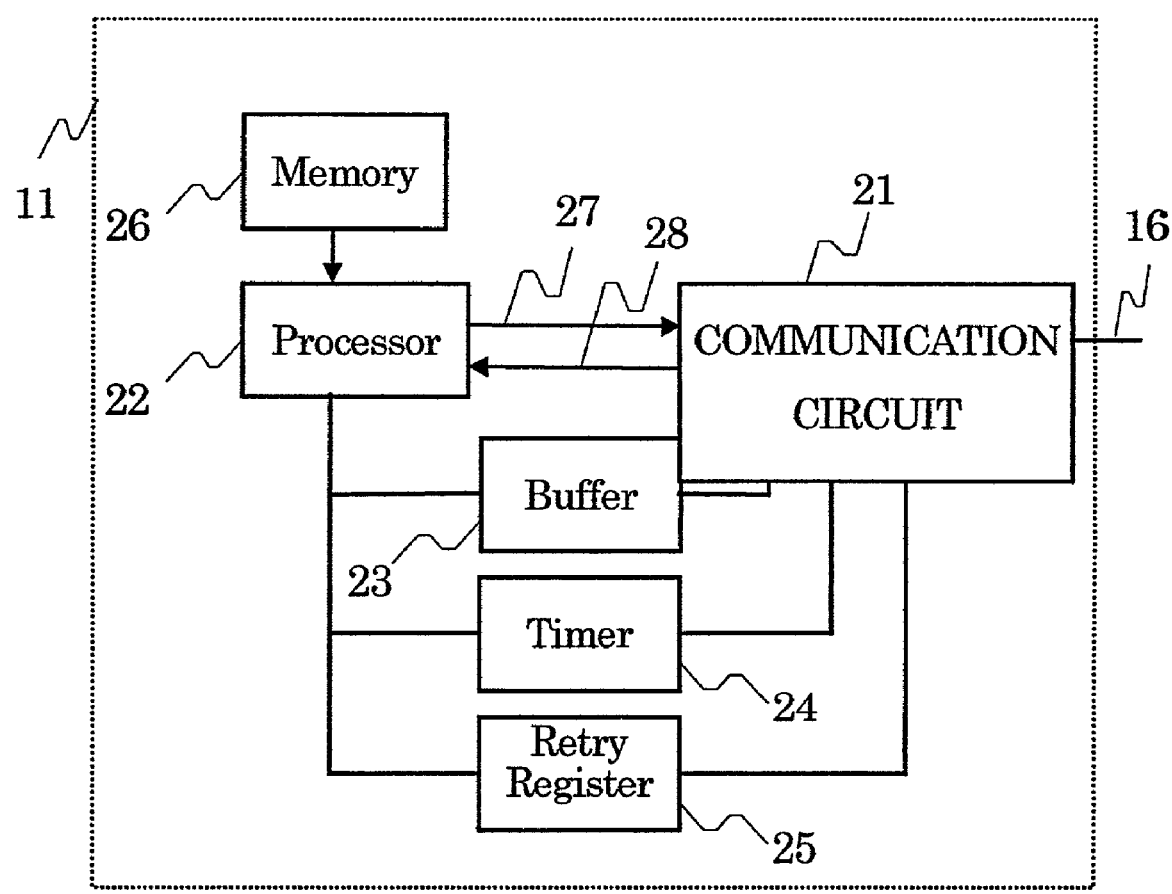
FIG. 3 shows a configuration block chart of a primary station in Embodiment 1.
Figures 4, 5:
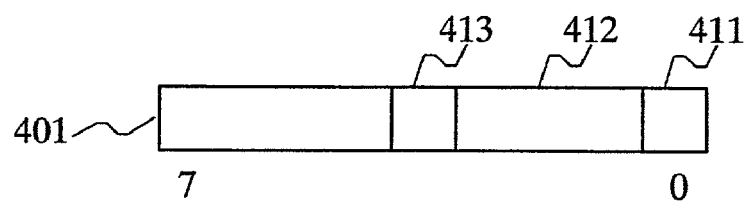
FIG. 4 illustrates an example of data stored in a buffer memory in the primary station in Embodiment 1.
FIG. 5 illustrates an example of a status byte in Embodiment 1.
Figure 6:
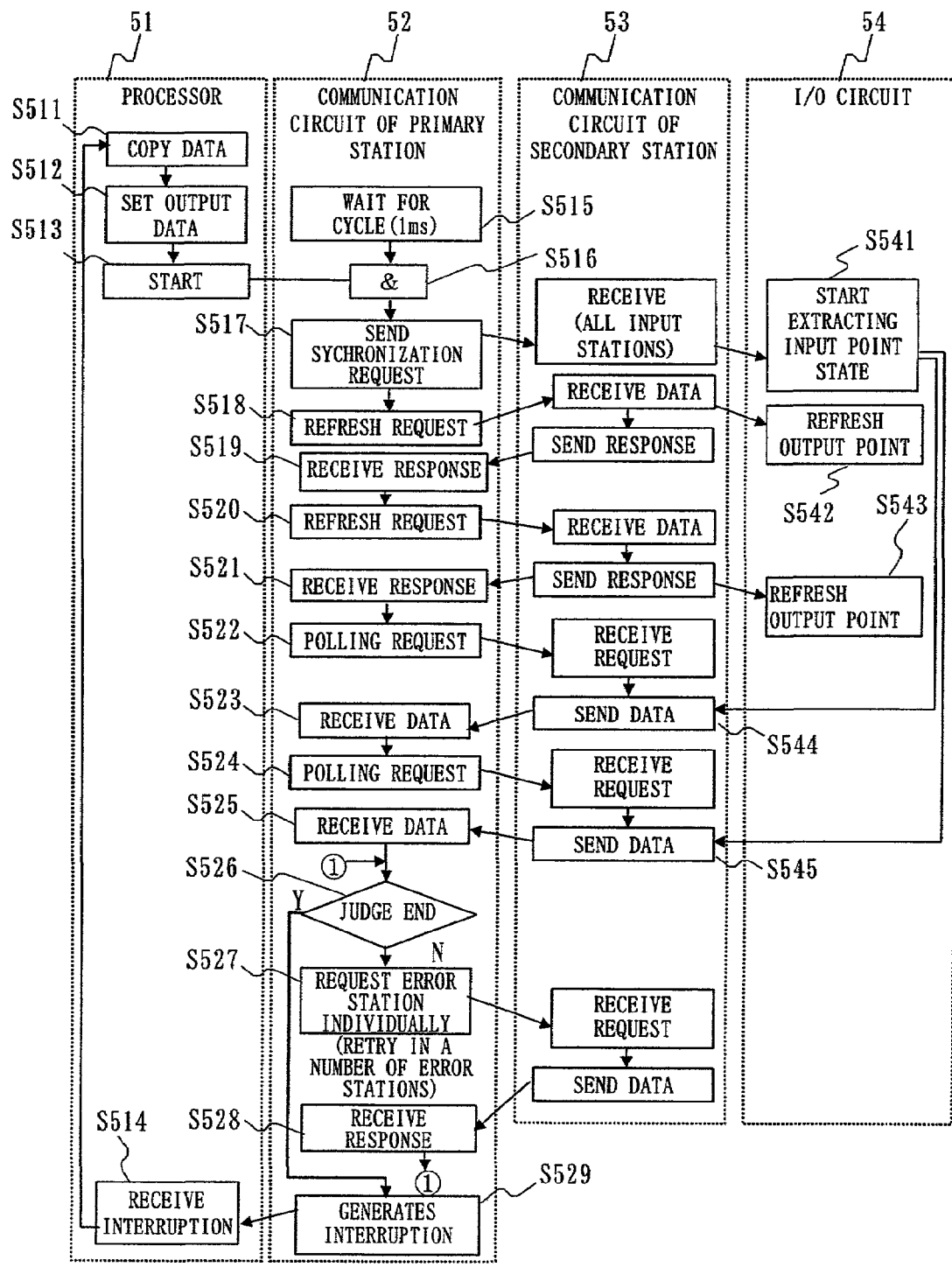
FIG. 6 illustrates an example of an operation sequence of an apparatus for sending and receiving serial data in Embodiment 1.

FIG. 2(A) illustrates a chart for explaining timing in a serial transmission bus in case of normal operations in the system of Embodiment 1. FIG. 2(B) illustrates a chart for explaining timing of a retry communication in case that an error is occurred at a response time in the system of Embodiment 1. FIG. 3 illustrates a block configuration chart of the primary station, and FIG. 4 illustrates a data configuration chart in a buffer memory in the primary station. FIG. 5 illustrates a configuration chart of a status byte, and FIG. 6 illustrates an operation flow chart. In the figures, a series of groups 101–103 of communications cyclically retried between the primary station and a plurality of secondary stations and determined time 104 of each of the groups of the communications are illustrated. A series of synchronization requests 110–118 (transmission units) transmitted in a typical group 102 of the communications is also illustrated. A synchronization request 110, refresh requests 111 and 112, refresh responses 113 and 114, polling requests 115 and 116, polling responses 117 and 118, and off time 119 and 120 between the request and the response are also illustrated. When a normal response is not obtained, an x is marked. A retry communication 121, a polling request 122 for retry, which is same as the polling request 115, a polling response 123 to the polling request 122, a polling request 124 for retry, which is same as the polling request 116, and a polling response 125 are illustrated.

A communication circuit 21, a processor 22, a buffer memory 23 for storing a record of 12 bytes, a timer 24 for outputting a determined time signal corresponding to the determined time 104, a retry register 25, a processor memory 26, an instruction 27 for starting the communication, and an interrupt signal 28 are illustrated.

A record 41 in which contents of the synchronization request 110 is stored, a record 42 of a correspondence between the refresh request 111 to the secondary station 13 and the refresh response 113, and a record 43 of a correspondence between the refresh request 112 to the secondary station 14 and the refresh response 114, a record 44 of a correspondence between the polling request 115 and the response 117 from the secondary station 12, a record 45 of a correspondence between the polling request 116 and the response 118 from the secondary station 15, and a record 46 for instructing to end are illustrated. Further, a status byte 401 used by the communication circuit 21 for own control information and response information to the processor 22, e.g., a communication state, a control byte 402 for responding from the secondary station, an address byte 403 of the secondary station, a control byte 404 describing a type of a request sent to the secondary station, a data area 405 of 8 bytes, a retry bit 411, a bit 412 of error factors, and a bit 413 for indicating a state of exceeding the cycle are illustrated. In a column 51, operations performed by the processor 22 in the primary station are illustrated. In a column 52, operations performed by the communication circuit 21 in the primary station are illustrated. In a column 53, operations performed by the communication circuit in the secondary station are illustrated. In a column 54, operations performed by an input and output (I/O) circuit of the secondary station are illustrated. The operations (steps) processed by the primary station, etc. are illustrated in S511–S545.

With reference to FIGS. 1–6, operations of this apparatus are explained.

In an area to which this invention is applied, a time record (time stamp) of input information and constant time for the communication must be ensured. The processor 22 must end the communication of a series of groups in approximately 50% of the determined time 104 for processing, e.g., time recording, etc. of the input information obtained by polling. Embodiment 1 illustrates a case in which two secondary stations of an output type and two secondary stations of an input type are provided as in the general system of FIG. 1. The determined time 104 is 1 millisecond.

At first, explanations are made on timing of the normal communication of the group 102 as illustrated in FIG. 2(A). The primary station 11 sends the synchronization request 110, and requests all the secondary stations of the input type to prepare data simultaneously. Then, the primary station 11 sends the refresh request 111 to the secondary stations 13 and 14 of the output type, receives the refresh response 113, sends the refresh request 112, and receives the refresh response 114 sequentially. Then, the primary station 11 sends the polling request 115 to the secondary stations 12 and 15 of the input type, receives the polling response 117, sends the polling request 116, and receives the polling response 118 sequentially. Such communication of the series of the groups are processed in the communication circuit 21 by an instruction from the processor 22. The processor 22 transmits contents of the instruction to the communication circuit 21 in a data configuration set in the buffer memory 23. The records 41–45 are set with an order of the above synchronization request 110, refresh requests 111 and 112, and polling requests 115 and 116. The processor 22 needs to rewrite only a part of data, e.g., data in the records, status byte, etc. within the determined time 104 by setting a data configuration based on a number of the secondary stations of the input type and the secondary stations of the output type in advance. Hence, a load of processing can be reduced.

With reference to the flow chart of communication processing in FIG. 6, sequential operations are explained.

If output data of the refresh request is changed, the processor 22 sets the data, initializes all status bytes (step S512), and instructs the communication circuit 21 to start the communication (step S513). Then, the processing goes to the time stamp of the data received in a previous cycle, the communication with an upper processor, etc. The communication circuit 21 waits for the instruction to start outputting by the timer 24 (step S516), reads the record 41 from the buffer memory 23, and sends the synchronization request 110 (step S517).

The secondary stations 12 and 15 of the input type receive the synchronization request 110, and start extracting data in an input point (step S541). Then, the communication circuit 21 reads the record 42, and sends the refresh request 111 (step S518). The secondary station 13 sends the refresh response 113, and refreshes the output point with the received data (step S542). Then, the communication circuit 21 receives the refresh response 113, writes a control byte in the record 42 (step S519), reads the record 43, and sends the refresh request 112 (step S520). The secondary station 14 sends the refresh response 114, and refreshes the output point with the received data (step S543). Then, the communication circuit 21 receives the refresh response 114, writes the control byte in the record 43 (step S521), reads the record 44, and sends the polling request 115 (step S522).

The secondary station 12 sends the polling response 117 together with a result of extracting data started in processing of step S541 (step S544). Then, the communication circuit 21 receives the polling response 117, writes the control byte and data in the record 44 (step S523), reads the record 45, and sends the polling request 116 (step S524). The secondary station 15 sends the polling response 118 together with the result of extracting the data started in processing of step S541 (step S545). Then, the communication circuit 21 receives the polling response 118, writes the control byte and data in the record 45 (step S525), and reads the record 46. Since the status byte instructs to end, the communication circuit 21 confirms that the status bytes of all the records 41–45 are without an error (step S526), and generates an interruption (step S529). The processor 22 performs processing of receiving an interruption by the interrupt signal 28 (step S514). Then, the processor 22 copies the data (records 44 and 45) received from the secondary stations 12 and 15 and stores in the processor memory 26 (step S511). Then, the processing in step S512 is retried.

Explanations are made on operations in case of a communication error, which are important in Embodiment 1.

In FIG. 2(B), if the primary station 11 doesn't receive the polling responses 117 and 118 normally, the primary station 11 performs the retry communication 121 after ending the transfer of the group 102. The retry communication 121 includes the polling request 122 to the secondary station from which the primary station 11 could not receive the response normally as in the above, the polling response 123, the polling request 124 to the secondary station 15, and the polling response 125. In this case, the communication circuit 21 detects a timeout in step S523 of receiving data, sets a timeout error in the bit 412 of error factors in the status byte of the record 44, and sets the retry bit 411. If at least an error is found in the status bytes among all the records 41–45 after ending the communication of the group 102, i.e., the communication circuit checks the retry bit 411 (step S526), the communication circuit 21 sends the polling request 122 corresponding to the records 44 and 45 in which the error are recorded (step S527). When the communication circuit 21 receives the polling response 123 from the secondary station 14 normally, the communication circuit 21 writes the control byte and data in the record 44, and clears an error record of the status byte.

Then, the communication circuit 21 sends the polling request to the secondary station (step S527), receives the polling response 125 (step S528), writes the response in the record 45, and clears the error. In this way, after checking if the status bytes of all the records 41–45 are without an error (step S526), an interruption is generated (step S529). In this explanation, a case of the error in polling is explained. However, retrying can be performed also in case of an error in refreshing.

As stated, the retry processing are performed for all the secondary stations with an error within a constant determined time in Embodiment 1. Therefore, the time stamp and communication can be performed within the determined time.

According to Embodiment 1, requests are retried within the same determined time only to the secondary stations which had problems in the responses during the determined time. Therefore, the correct data can be obtained without losing the real time characteristics.

Embodiment 2.

Explanations are made on a case in which the group 102 of the communication becomes relatively longer than the determined time 104 of Embodiment 1 and time for the retry communication 121 cannot be increased.

For example, there is a case in which the retry communication doesn't succeed even by retrying due to degradation of a quality of the serial transmission bus 16 and a malfunction of the secondary station. In Embodiment 2, as illustrated in FIG. 3, the primary station 11 includes the retry register 25 which can be set from the processor 22. When a number of retries reaches a value set in the retry register 25, the communication circuit 21 ends the retry communication, and reduces performance time of the retry communication 121.

It is also possible that the primary station 11 includes a maximum communication time register which can be also set by the processor 22 instead of the retry register 25 and the communication circuit 21 ends the retry communication when a time value of the timer 24 reaches a value in the maximum communication time register in retrying. The performance time of the retry communication 121 can be also controlled in this way.

Explanations are made on an actual method for judging the timeout.

Figure 7:
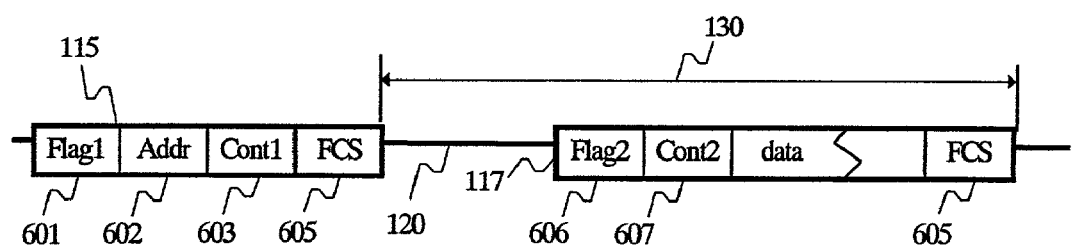
FIG. 7 illustrates an explanatory chart of monitoring a timeout in Embodiment 2 of this invention.

FIG. 7 illustrates a chart for showing timing in a monitor time range of the timeout. In FIG. 7, a monitor time 130 of the timeout is illustrated. The polling request 115 and the polling response 117 in FIG. 2(B) are enlarged in FIG. 7. If the polling response cannot be received normally within the monitor time 130 after an end of the polling request 115, the communication circuit 21 in the primary station 11 judges it as the timeout. Since the off time 120 is limited within a range of 10–20 bit time and the polling response 117 includes 11 bytes, i.e., 11×8/4×5=110 bit time by 4B5B code conversion, the monitor time 130 is 12–13 μsecond or more from a communication rate of 10 M bit/second. For example, by setting the monitor time of the timeout for 14μ second, an increase in the communication time due to the error can be controlled. Hence, the maximum time for the communication can be assured.

Accordingly, the number and time of retrying are limited, and the response frame can be shortened. Therefore, the real time characteristics can be assured even if a plurality of errors occurs.

Embodiment 3.

The real time characteristics in the polling method has a priority in this invention. Explanations are made on a mechanism of giving a priority on processing of an error.

In case of retrying due to the error, the time stamp is corrected. Particularly, in the retry operations in the previous embodiment, in case of retrying due to frequent occurrence of errors in the communication and the timer 24 outputs a next cycle signal as the communication time becomes longer, the communication circuit 21 sets the bit 413 for indicating a state of exceeding the cycle in the status byte

401. After the retry communication is ended, when the processor 22 receives the interrupt signal 28, the processor 22 recognizes that the retry is not completed within the determined time from the bit 413 in the status byte 401. Therefore, the processor 22 corrects the time of the time stamp before outputting a next instruction 27 for starting communication.

In some cases, since the processor 22 becomes overloaded temporarily and an instruction for starting the communication (step S513) is delayed, it is impossible to maintain the time for the retry communication 121. In that case, since the communication circuit 21 has received a cycle signal from the timer 24, when the communication circuit 21 receives the instruction for starting the communication (step S513) from the processor, even if an error is found in judgement of ending (step S526), the communication circuit 21 judges as the end, and generates an interruption (step S529). As stated, the retry communication 121 can be reduced forcefully.

Embodiment 4.

Explanations are made on a case of reducing the communication time by limiting a retry number instead of giving the priority on the real time characteristics.

Figure 8:
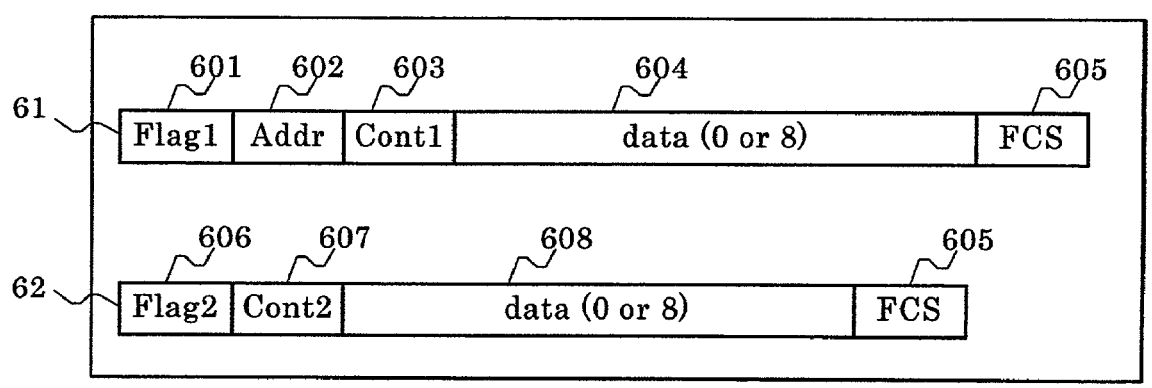
FIG. 8 illustrates an example of a frame configuration of transmission data in Embodiment 4 of this invention.

FIG. 8 shows a configuration chart of a frame transmitted in the serial transmission bus 16 in Embodiment 4. In FIG. 8, a request frame 61 sent by the primary station and a response frame 62 sent by the secondary station are illustrated. A first flag byte 601 output by the primary station, an address byte 602 for designating the secondary station, a control byte 603 for informing the secondary station of a request type, etc., data 604 of 8 bytes sent to the secondary station, an error check byte 605, a second flag byte 606 output by the secondary station, a control byte 607 output by the secondary station, and data 608 of 8 bytes output by the secondary station are also illustrated. The data 604 and 608 are omitted depending on a type of the frame. Further, in sending, 4B5B encoding and NRZI (Non-Return-to-Zero, Invert-on-Zero) modulation are performed except for the flag bytes 601 and 606, and each byte is transmitted in 10 bit time. In receiving, NRZI demodulation and 4B5B decoding are performed. A communication rate in the serial transmission bus 16 is 10 M bit/second.

FIG. 9 shows a chart of a correspondence of 4B5B codes. In FIG. 9, a column of the 4B codes shows codes used in normal processing. In receiving, 5B codes are converted by 4B5B decoding. A column of the 5B codes shows codes which are converted by 4B5B encoding and sent. As the flag bytes 601 and 606, 5B codes, e.g., 0000010001 for the first flag byte 601 and 0000000101 for the second flag byte 606 which are not in the column of the 5B codes in the chart of the correspondence of the codes are used. When a value of the 5B code is zero, a serial signal is inverted by the NRZI modulation. Therefore, since the concerning flag bytes 601 and 606 often have a bit with a value of zero, bit synchronization and frame synchronization in receiving becomes easy.

According to the related art, the flag byte 601 and the flag byte 606 are in a same code. Therefore, it is necessary to provide a byte equivalent to an address byte in the related art in the frame sent from the secondary station for designating the primary station. However, as stated, the address byte can be deleted from the frame sent from the secondary station by employing the 4B5B encoding and using two exclusive flag bytes. Further, since the data 604 and 608 are in a fixed length, a byte for specifying a data length and a special flag for indicating the end are not necessary. Hence, the communication time can be shortened.

Embodiment 5.

There are some cases in which a response is delayed in the secondary station even within the determined time. Explanations are made on an idea of assuring the real time characteristics in such cases. It is a mechanism of sending after a response of another apparatus is ended.

Figure 10:
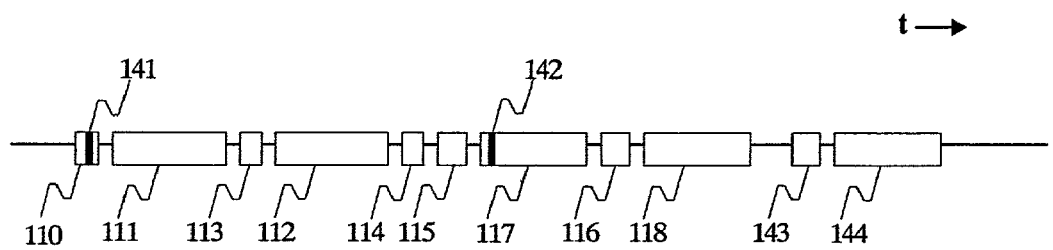
FIG. 10 illustrates a chart for explaining data transmission timing of the apparatus for sending and receiving the serial data in Embodiment 5 of this invention.

FIG. 10 illustrates a chart for explaining timing of an example of an AI (Analog Input) synchronization request and its response. In FIG. 10, an AI synchronization bit 141 of a control byte in a synchronization request frame, a busy bit 142 of a control byte in a polling response frame, a polling request 143 retried corresponding to a busy response, and a polling response 144 are illustrated. A secondary station of an AI input type needs more time than a secondary station of a DI (Digital Input) type for preparing data after receiving the synchronization request 110. When the data are not prepared in the polling response 117 corresponding to the polling request 115, the busy bit of the control byte is turned on and responded. After ending the communication of the series of the groups, the communication circuit 21 in the primary station retrieves a record of the polling request, and retries for a record in which the busy bit is set (busy retry). Accordingly, the data from the secondary station of the AI input type which has not prepared data can be received within the same determined time.

With reference to FIG. 10, the busy retry operations are explained. If the primary station stores information on a type of each of the secondary stations and knows in advance that the AI data are prepared after the determined time, the communication circuit 21 can skip processing of the communication of the concerning record by setting the status byte of the record corresponding to the secondary station of the AI input type invalid. Hence, unnecessary communication can be reduced, and free time, which can be used for the retry communication after the timeout, can be generated.

The synchronization request with AI synchronization is not put at a header in any group of the communications. The synchronization request with AI synchronization appears once in some cycles, e.g., four cycles. Therefore, it is possible that the communication circuit 21 stores that the synchronization request with AI synchronization is sent and prohibits the busy retry within the same determined time.

Further, it is also possible that the communication circuit 21 performs the busy retry only when the communication circuit 21 receives a permission for the busy retry from the processor 22 by providing a retry permission register which is not shown in FIG. 3 in the primary station 11.

Embodiment 6.

The secondary station is changed to a normal unit, if a unit has a malfunction. After changing to the normal unit, when the normal unit is connected to a system and the system is returned, resetting of the system is usually not performed. Therefore, initialization corresponding to the returned secondary station is necessary as the system.

Figure 11:
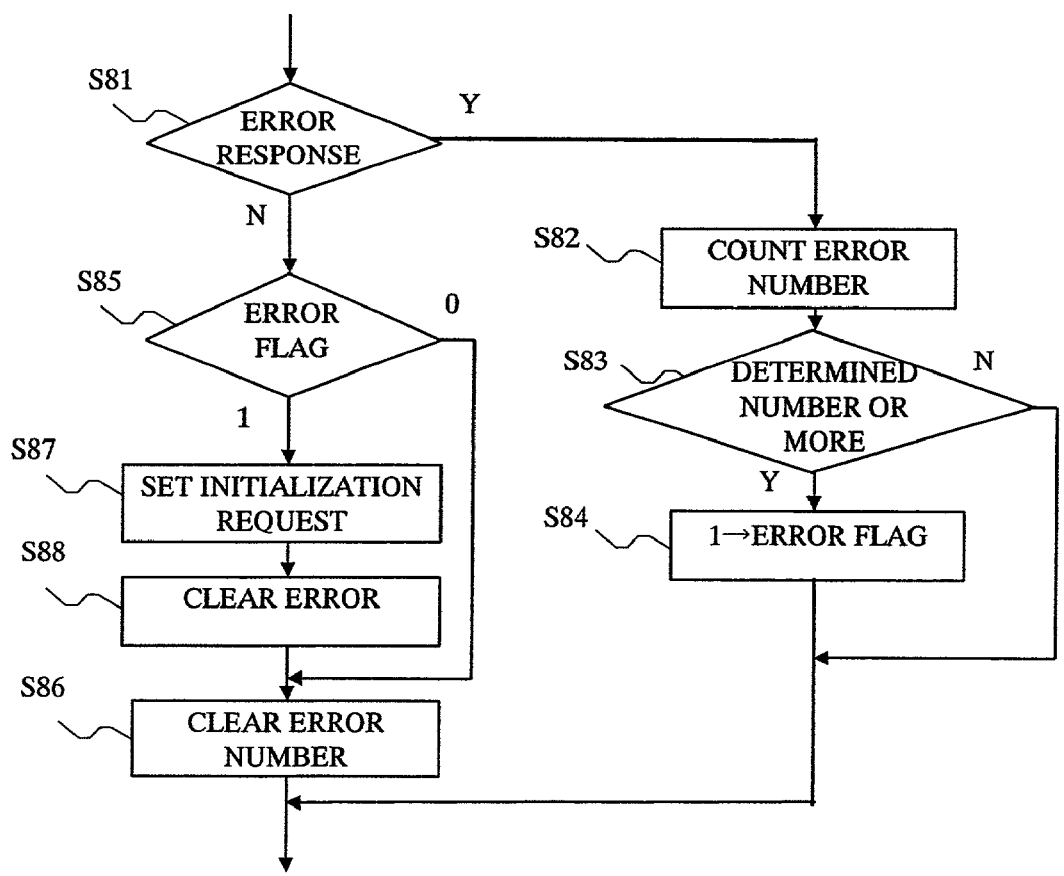
FIG. 11 illustrates an operation flow chart of the primary station in Embodiment 6 of this invention.

FIG. 11 shows a flow chart concerning on changing of the secondary stations performed by the processor 22. The processor 22 judges if it is a secondary station (having a malfunction) from which a normal response is not obtained in processing of step S511 described in Embodiment 1 (step S81). If it is in the malfunction, the processor 22 counts a number of errors (step S82), and judges if the number is a determined number or more (step S83). If the number is the determined number or more, an error flag is turned on (step S84). The error flag is provided in the processor memory 26 for each of corresponding secondary stations. If the corresponding secondary station is not in the error (step S81) and the error flag is not turned on (step S85), the number of errors is cleared (step S86). If the error flag is on (step S85), an initialization request is set in a corresponding record (step S87), and the error flag is cleared (step S88). The initialization request is sent to the secondary station through the communication circuit 21 for initializing (parameter setting, etc.) the secondary station. As stated, when a normal response is received from the secondary station with an error flag on, it is possible to judge that the secondary station is changed during system operations for responding normally. In that case, the initialization request can be sent to the secondary station to initialize the secondary station and return to a normal state.

In the explanations of FIG. 11, it is judged that the secondary station is changed during system operations and the normal response is made, and the initialization request is sent. It is possible to check if the new secondary station is in a same type with the replaced secondary station before returning the secondary station of the error to a normal state by collecting the information on the type (input type/output type, number, etc.) of the new secondary station, and sending a test request, sending an initialization request in a next cycle, if the collected information is normal.

Embodiment 7.

Explanations are made on another idea of reducing retrying of the requests by reducing the errors.

Figure 12:
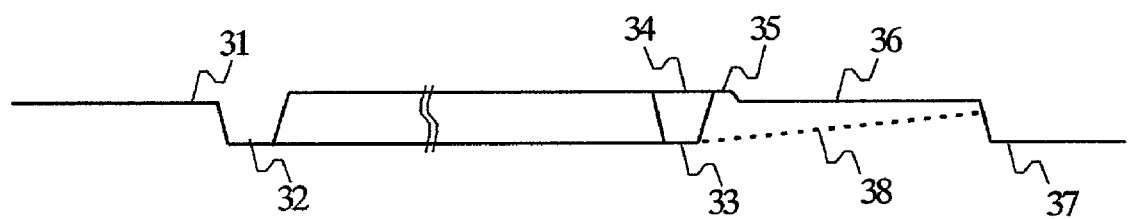
FIG. 12 illustrates an example of a waveform of data transmission of the apparatus for sending and receiving the serial data in Embodiment 7 of this invention.

FIG. 12 illustrates a waveform of a serial transmission signal of each frame. In FIG. 12, no-signal state (off time) 31, a low potential state 32 at a beginning of the frame, a low potential state 33 at an end of the frame, a high potential state 34 at an end of the frame, a high potential state 35 of a frame transmission signal, a waveform 36 of a signal in case of tuning off at the high potential state 35, and a low potential state 37 at a beginning of a next communication frame are illustrated. In case of turning off in the low potential state 33 at the end of the frame transmission, the potential rises gradually as in a signal 38. When a load capacity in the serial transmission bus is large, there are some cases in which the potential doesn't rise before the state 37 at the beginning of the next frame. This causes an error in synchronization of receiving the next frame. Therefore, at the end of the frame transmission, a high potential is forcefully output for a short period, and the high potential is maintained at a next no-signal state for improving an accuracy of the synchronization in receiving the frame.

Embodiment 8.

A system configuration chart of Embodiment 8 is same as the general system configuration as illustrated in FIG. 1.

Figure 13:
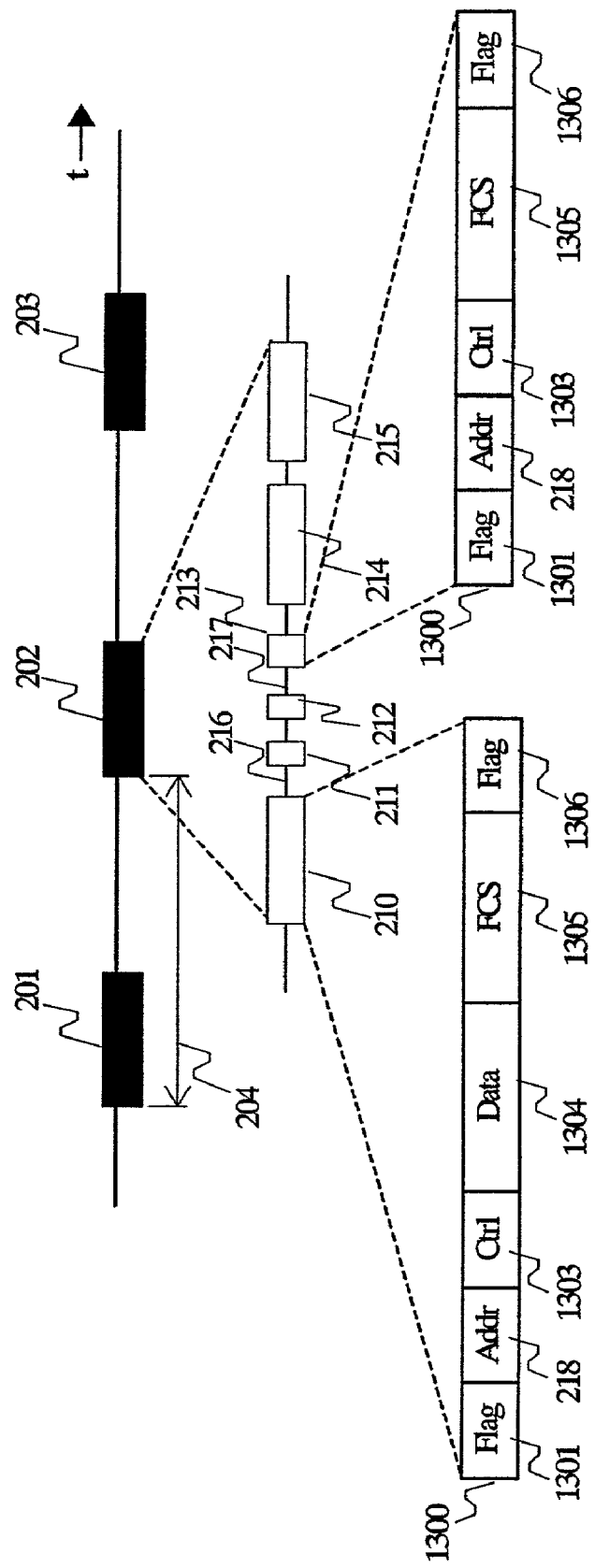
FIG. 13 illustrates a chart for explaining timing in a transmission bus and an example of contents of data in Embodiment 8 of this invention.
Figure 14:
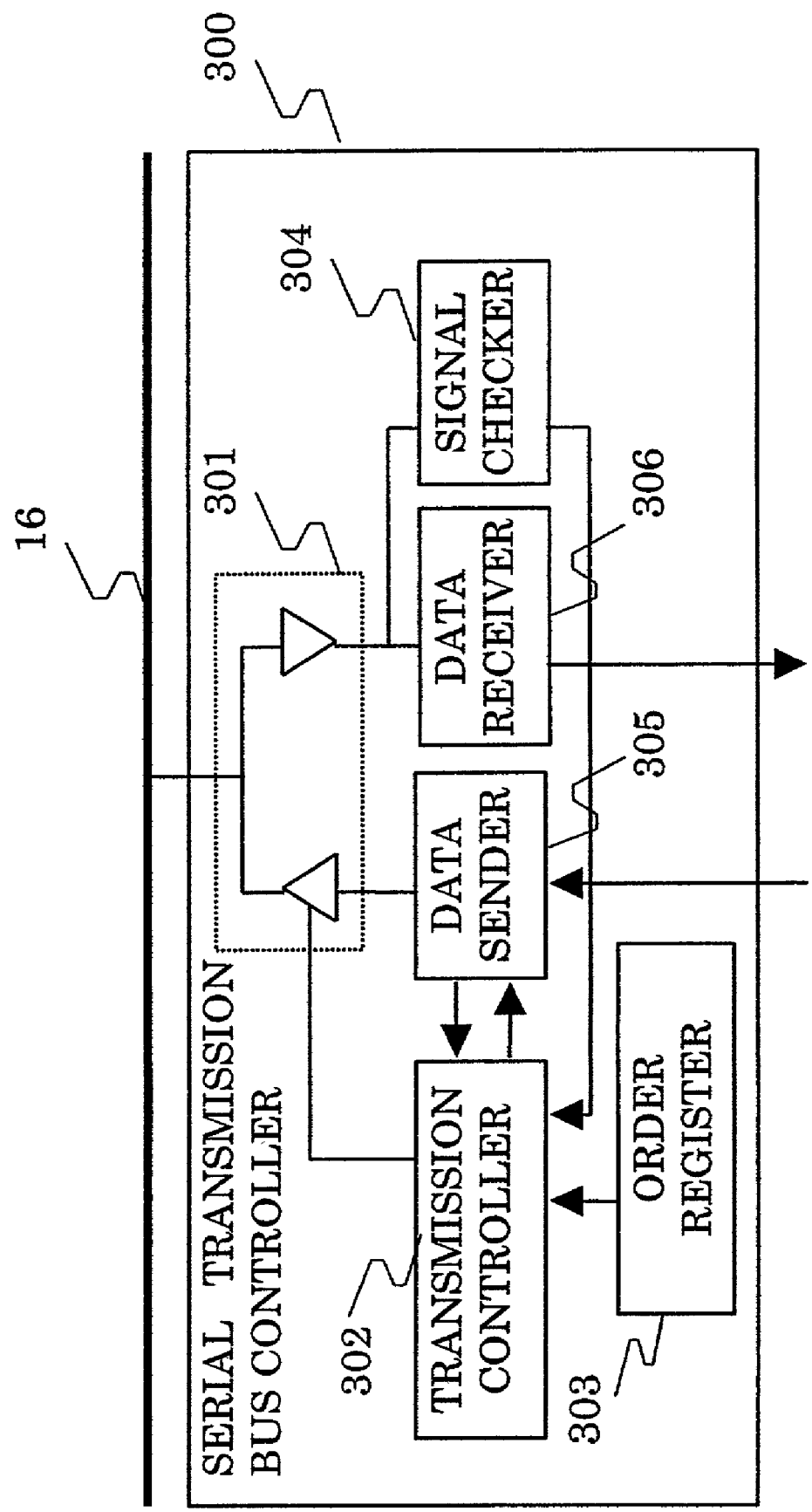
FIG. 14 illustrates a configuration chart of a transmission bus controller of a secondary station in Embodiment 8.

FIG. 13 is a chart for explaining timing in a serial transmission bus in an embodiment of this invention. FIG. 14 is a block configuration chart of a serial transmission bus controller in the secondary station, and FIG. 6 is an operation flow chart of the system.

In FIG. 13, a series of groups 201–203 of communications cyclically retried between the primary station and the plurality of secondary stations, and determined time 204 of each of the groups of the communications are illustrated. A series of frames (transmission units) 210–215 transmitted in a typical group 202 of the communications, a refresh request 210, refresh responses 211 and 212, a polling request 213, polling responses 214 and 215, and off time 216 between a request and a response are also illustrated. An address 218 designating all the secondary stations or a respective secondary station is also illustrated.

In FIG. 14, a controller 300 for controlling transmission to the serial transmission bus 16 in the secondary station, a transceiver 301, a transmission controller 302 for determining a timing of transmission of a response, an order register 303, a signal checker 304 for monitoring a change of a signal line in the serial transmission bus 16, a data sender 305, and a data receiver 306 are illustrated.

In FIG. 6, steps performed by the processor of the primary station are in the column 51, steps performed by the communication circuit (not illustrated) of the primary station are in the column 52, steps performed by the serial transmission bus controller 300 of the secondary station are in the column 53, and steps performed by an input/output circuit (not illustrated) of the secondary station are in the column 54. Actual processing items (steps) are respectively shown in steps S511–S545.

With reference to FIGS. 6, 13, and 14, explanations are made on a basic idea of the operations in Embodiment 8.

In an area of this invention, it is necessary to record time (time stamp) of input data and complete the communication within the determined time. The primary station 11 must perform processing, e.g., time recording, etc. of the input data obtained by polling, and end the communication of the series of the groups of the communications within the determined time. In Embodiment 8, explanations are made on a case in which two secondary stations of the output type and two secondary stations of the input type are provide as illustrated in FIG. 1.

The primary station sets serial numbers in the order register 303 in all the secondary stations before making the refresh request and the polling request to the secondary stations. The numbers are provided independently for the secondary stations of the input type and the secondary stations of the output type. For example, the primary station sets "1" for the secondary station 12, "1" for the secondary station 13, "2" for the secondary station 14, and "2" for the secondary station 15.

The timing of the typical group 202 of the communications as illustrated in FIG. 13 has the following meaning. The primary station 11 sends all the refresh data for the secondary stations 13 and 14 of the output type as the refresh request 210. The serial transmission bus controller 300 in each of the secondary stations 13 and 14 receives the refresh request 210 for the own station and all the secondary stations by referring to the address 218. Then, the serial transmission bus controller 300 delivers the received data to an output circuit via the data receiver 306. The signal checker 304 monitors a change of signals in the serial transmission bus 16, and detects an end of the frame transfer, if the signals are not changed for a constant time.

The transmission controller 302 controls a response order from the own station by comparing the completion of the frame transfer and the value set in the order register 303. For example, if the value set in the order register 303 is "1", the transmission controller 302 in the secondary station 13 sends a permission for the transmission of the refresh response 211 to the data sender 305 as soon as the signal checker 304 judges the completion of the frame transfer of the refresh request. When the secondary station 13 completes the frame transfer of the refresh request, the transmission controller 302 in the secondary station 14 sends a permission for the transmission of the refresh response 212 to the data sender 305. Since the secondary stations 12 and 15 are in the input type, they do not respond to the refresh request.

Then, the primary station 11 sends the polling request 213 to all the secondary station of the input type. The serial transmission bus controller 300 in each of the secondary stations 12 and 15 reads the polling data from an input circuit as soon as receiving the polling request 213 to the own station and all the secondary stations by referring to the address 218. Controlling of the transmission of the polling response is same as the operations in sending the refresh response.

The series of the groups of the communications is processed by the communication circuit in the primary station by an instruction from the processor in the primary station. The processor only receives the response from the secondary stations in addition to sending the refresh request and the polling request once. Therefore, the processing by the processor can be reduced. Further, the transmission time can be shortened, i.e., reduction of 30% in maximum compared with the second and third related arts.

Since the sequential operations shown in FIG. 6 are basically same as Embodiment 1 except that the transmission is performed in a determined sequence order in this embodiment, detailed descriptions are omitted.

As stated, according to this invention, the transmission sequence of the communication between the primary station and the secondary stations is predetermined, and descriptions are simplified. Therefore, the time for the communication can be shortened. Further, the load of processing can be reduced.

In these embodiments, the secondary station obtains the order from a change of the signal lines in the serial transmission bus 16, and controls the timing of starting the transmission from the own station based on the order. However, it is also possible to set a separate timer for each of the secondary stations in advance and control the transmission order in monitoring the time by using the timer.

Figure 15:
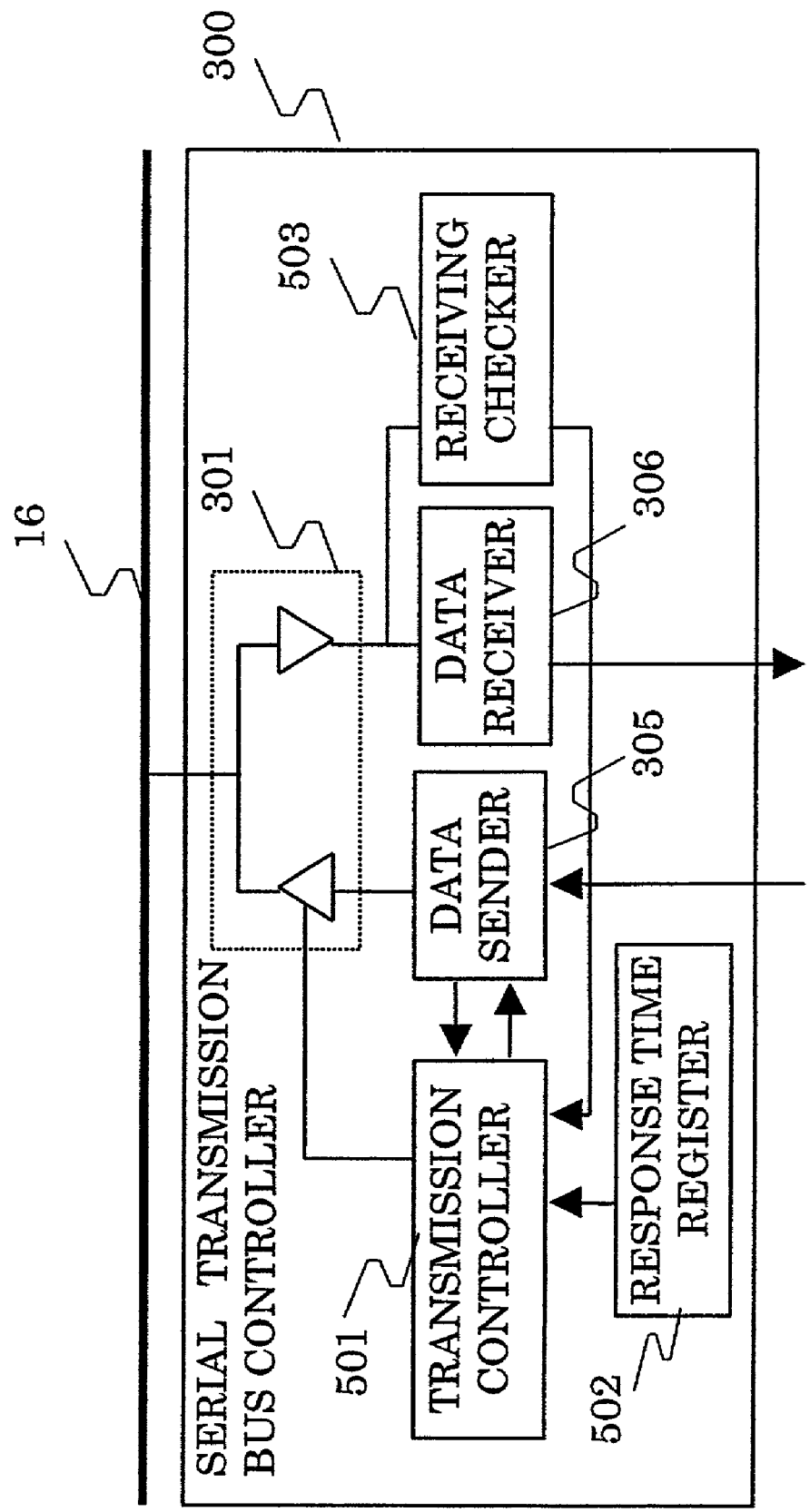
FIG. 15 illustrates a configuration chart of another transmission bus controller in Embodiment 8.

FIG. 15 shows a configuration chart of the serial transmission controller 300 in such an embodiment.

In FIG. 15, a transmission controller 501 for determining if the transmission is possible, a response time register 502 for setting time for waiting for the response in the own station, and a receiving checker 503 for monitoring the completion of the request frame transfer from the primary station are illustrated. Other signs same as in FIG. 14 are same or equal elements with the signs with FIG. 14.

With reference FIGS. 13 and 15, operations of this apparatus are explained.

The primary station sets a waiting time for a response for each of the secondary stations in the response time register 502 in each of all the secondary stations as stated already.

Explanations are made on the timing of the typical group 202 of the communications illustrated in FIG. 13. Since the configuration is same as the configuration of FIG. 14 except for judgement of the order, a different part is explained in details.

At first, the refresh request 210 is sent simultaneously. The secondary stations 13 and 14 receive the refresh request 210, and the receiving checker 503 detects the completion of the transfer of the refresh request frame.

The transmission controller 501 controls the transmission of the response from the own station in detecting the completion of the frame transfer by the receiving checker 503 and using the value set in the response time register 502. For example, in case that 20 microsecond is set in the response time register 502 in the secondary station 13, the secondary station 13 returns the refresh response in 20 microsecond after receipt of the refresh request 210. Since the secondary stations 12 and 15 are in the input type, they do not respond to the refresh request.

Then, the primary station 11 sends the polling request 213 to all the secondary stations of the input type. The secondary stations 12 and 15 read the polling data from the input circuit, and sends the polling response as soon as they receive the polling request 213.

As stated, the load of the processing by the processor can be reduced and the time for the transmission can be shortened by controlling the order in monitoring the time.

As stated, the primary station makes the polling request and the refresh request without designating the address to the secondary stations by predetermining a response order from the secondary stations according to this invention. Therefore, the overhead of the data communication can be reduced, and the time for the communication can be reduced.

Embodiment 9.

In Embodiment 1, in case that the secondary station doesn't respond due to a malfunction, etc., the primary station detects the error, and controls the retry transmission. In Embodiment 9, explanations are made on a case in which the secondary station detects the error and responds.

Figure 16:
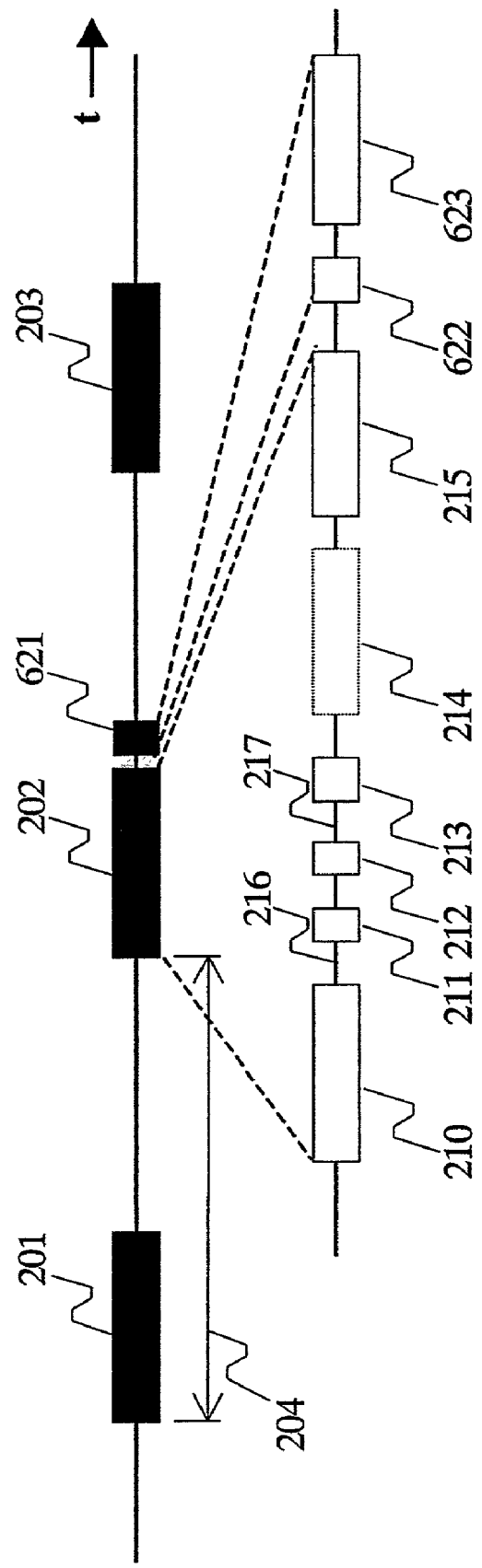
FIG. 16 illustrates a chart for showing timing in a transmission bus and an example of contents of data in Embodiment 9 of this invention.
Figure 17:
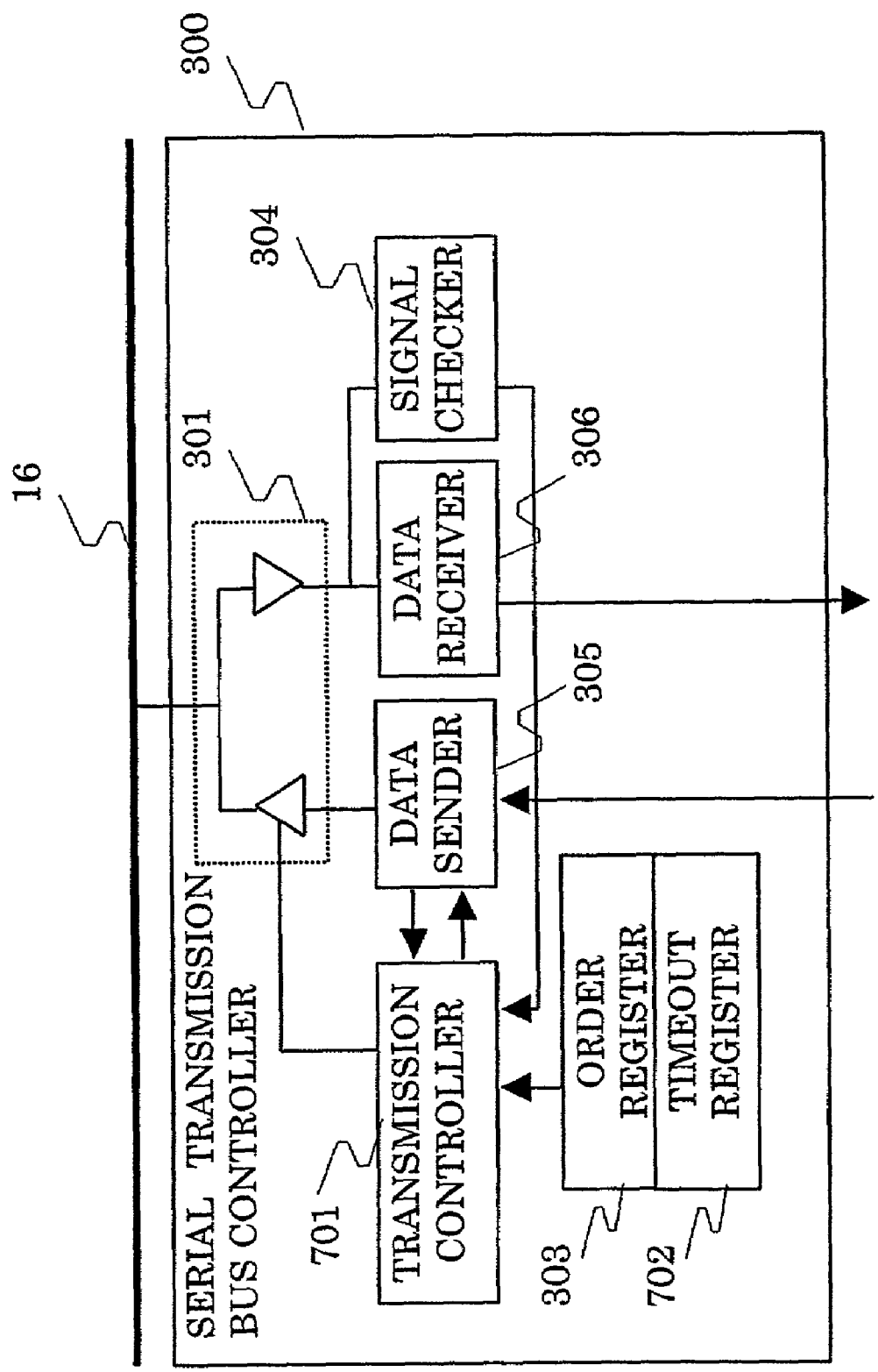
FIG. 17 illustrates a configuration chart of a transmission bus controller of a secondary station in Embodiment 9.

FIG. 16 shows a chart for explaining the timing in case that the polling response 214 (illustrated in a broken line) is not returned from the secondary station 12. FIG. 17 shows a configuration chart of the serial transmission bus controller in Embodiment 9. In FIG. 17, a transmission controller 701 for determining if the transmission is possible, and a timeout register 702 for setting a response timeout time of the secondary station are illustrated. Other signs which are also in FIGS. 13 and 15 are same or equal elements with the signs in FIGS. 13 and 15.

With reference to FIGS. 16 and 17, explanations are made on operations of this apparatus.

The primary station sets the response timeout time in each of the timeout registers 702 of all the secondary stations before making the refresh request and the polling request to the secondary station.

Explanations are made on the timing of the typical group 202 of the communications illustrated in FIG. 16. Controlling of the refresh request and refresh response is same as in Embodiment 8.

Then, the primary station 11 sends the polling request 213 to all the secondary stations of the input type. In case that the transmission controller 701 in the secondary station 15 doesn't receive a notice of the completion of the frame transfer from the signal checker 304 within the value set in the timeout register 702, i.e., the system is in a hold state in some reason, the transmission controller 701 judges that the response timeout has occurred, and permits the transmission of the polling response 215. When the timeout is detected, the transmission is started voluntarily in a turn of the own station.

When the primary station receives the polling response 215 from the secondary station 15, the primary station retries the polling request only to the secondary station 12 of the timeout.

The series of the communication is processed by the communication circuit in the primary station based on the instruction from the processor in the primary station. Even if a response timeout occurs, the processor needs to retry the transmission of the request only to the secondary station in the error, and the processor doesn't need to send the address. Hence, the processing can be reduced, and the response within the cycle can be assured.

Further, since a mechanism equivalent to a counter or a timer is provided in the secondary station, the load on the primary station can be further reduced.

Embodiment 10.

In another field to which this invention is applied, the reduction of the communication time is more important than the communication error.

In Embodiment 10, a bit for indicating requiring no response is provided in the refresh request frame sent from the primary station, and the secondary station controls if the refresh response is sent or not by setting or resetting the concerning bit.

Figure 18:
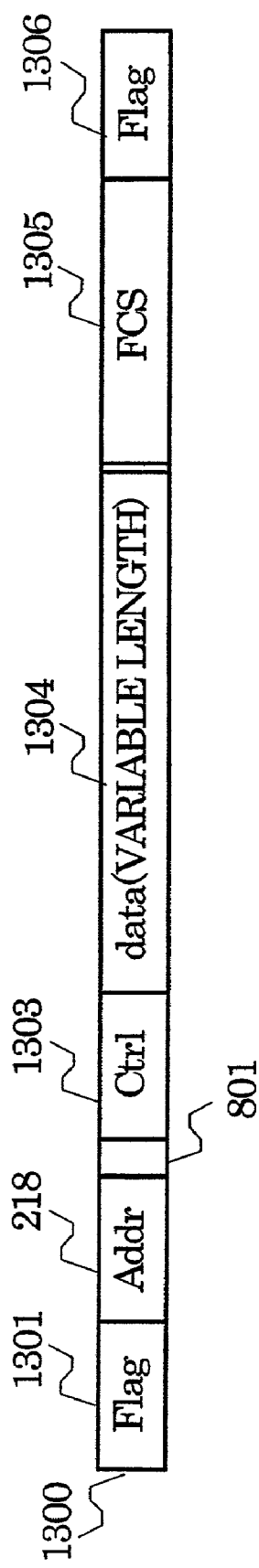
FIG. 18 illustrates an example of a frame configuration in Embodiment 10 of this invention.
Figure 19:
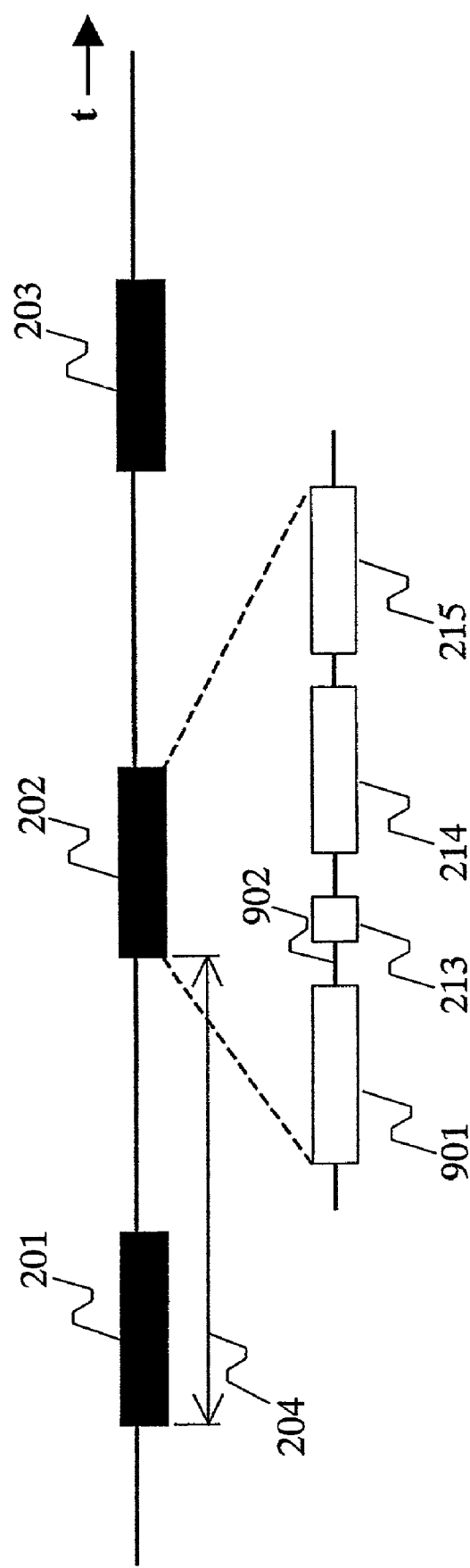
FIG. 19 illustrates a chart for explaining timing in a transmission bus in Embodiment 10.

FIG. 18 shows a frame configuration chart of the embodiment of the bit for indicating requiring no response. FIG. 19 illustrates a chart for explaining the timing in case that a no response (request) bit for indicating response is not needed to the primary station. In FIGS. 18 and 19, a bit 801 for indicating no need to respond, a refresh request 901 in which the bit 801 for indicating no need to respond is turned on, i.e., the signal showing that no refresh response is required, if the bit 801 for indicating no need to respond is turned on, and off time 902 between the requests are illustrated. Other signs which are also in FIG. 13 are same or equal elements with the signs in FIG. 13.

With reference to FIGS. 18 and 19, explanations are made on operations of this apparatus.

Explanations are made on the timing of the typical group 202 of the communications illustrated in FIG. 19. At first, the primary station 11 collects the refresh data for the secondary stations 13 and 14 of the output type as the refresh request 901 in which the bit 801 for indicating no need to respond is turned on. The secondary stations 13 and 14 receive the refresh request 901 for the own station and all the secondary stations by referring to the address 218, and check the bit 801 for indicating no need to respond of the received frame. Since the bit for indicating no need to respond is on, the refresh response is not sent.

Then, the primary station 11 sends the polling request 213 to all the secondary stations of the input type after the off time 902 has passed. The secondary stations 12 and 15 read polling data from the input circuit as soon as receiving the polling request 213 for the own station and all the secondary stations by referring to the address 218. Controlling of the transmission of the polling response is same as the operations in case of sending the polling response in Embodiment 8.

As stated, according to this invention, the communication time can be reduced by controlling if the response from the secondary station is sent.

In Embodiment 10, the primary station controls if the response from the secondary station is sent. However, it is also possible that the secondary station sends the response in case of the error.

Figure 20:
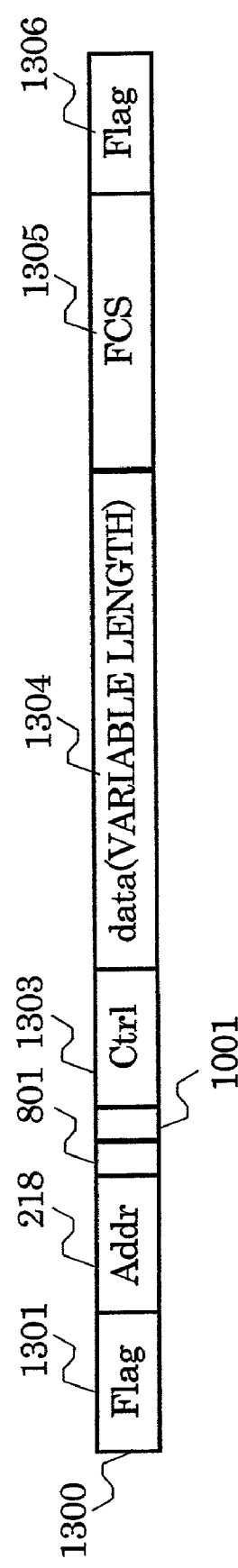
FIG. 20 illustrates another example of a frame configuration in Embodiment 10 of this invention.
Figure 21:
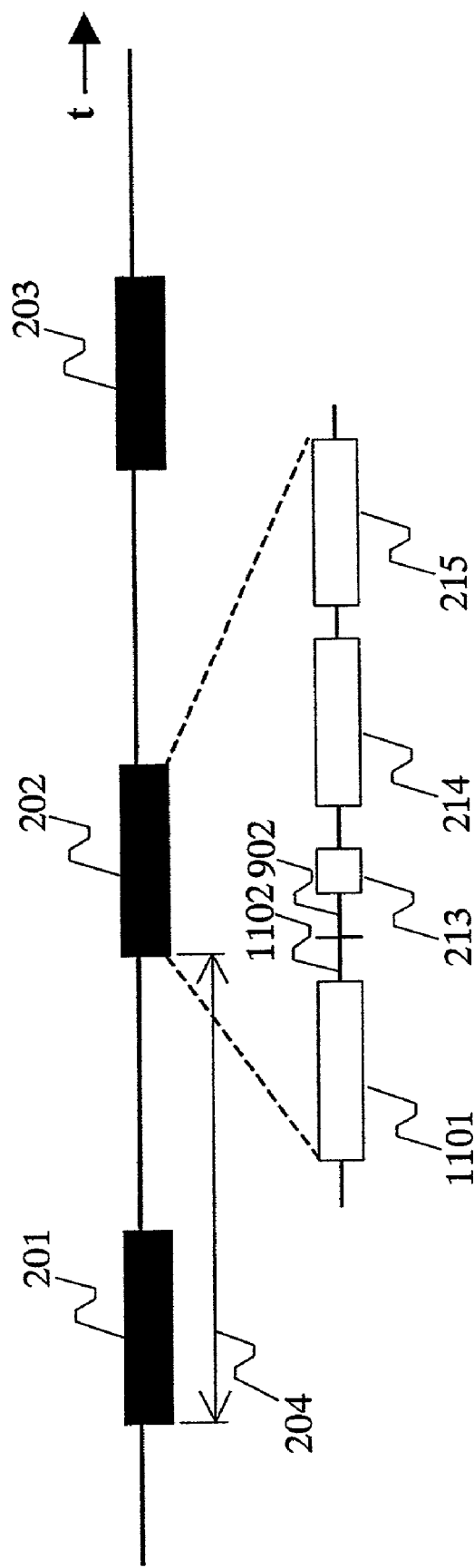
FIG. 21 illustrates another chart for explaining timing in a transmission bus in Embodiment 10.
Figure 22:
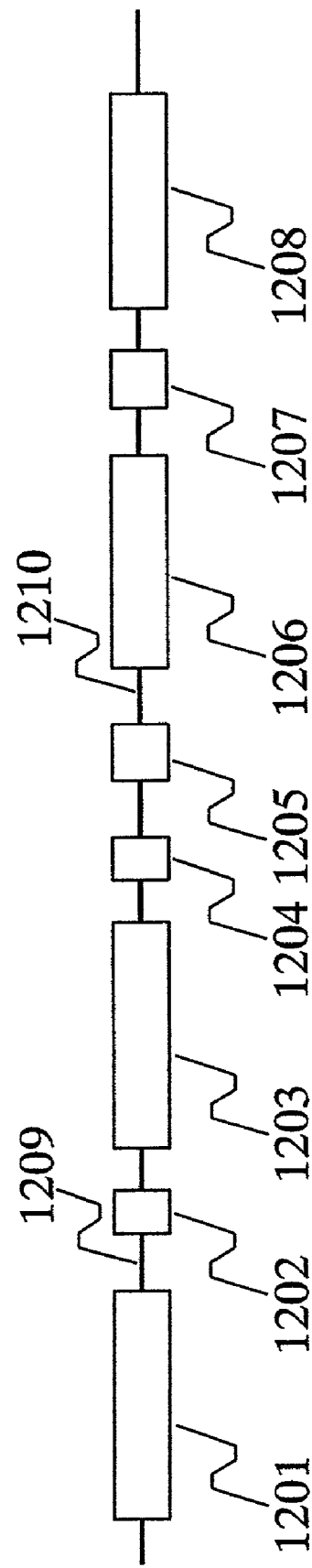
FIG. 22 illustrates a chart for explaining communication timing of HDLC.
Figure 23:
FIG. 23 illustrates a configuration chart of a frame defined by HDLC.
Figure 24:
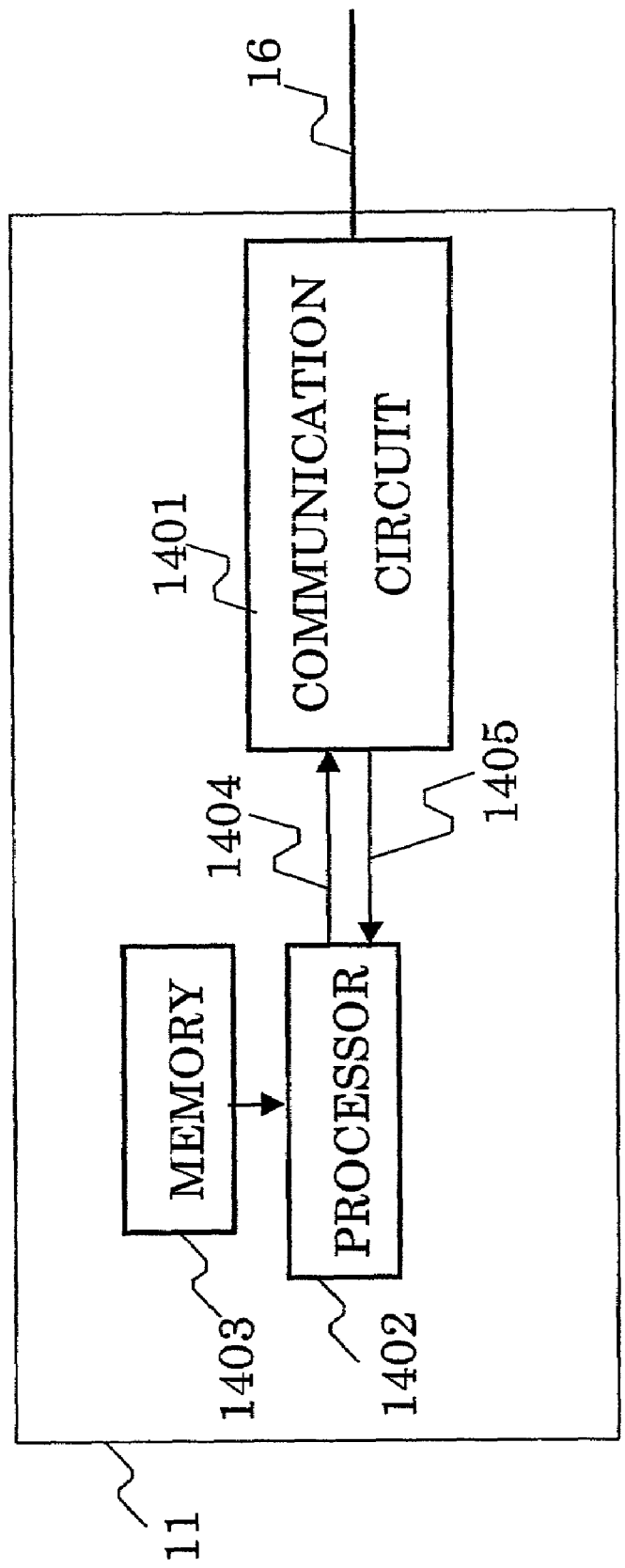
FIG. 24 illustrates a configuration chart of a primary station according to the related art.
Figure 25:
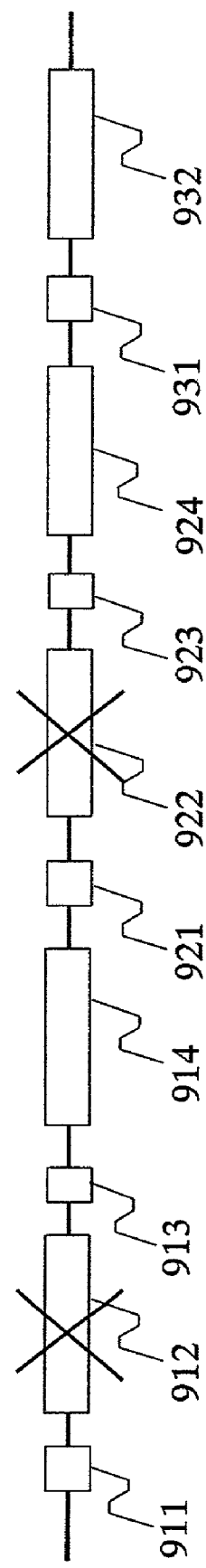
FIG. 25 illustrates a chart for explaining retry timing in a system for collecting serial data in a polling system according to the related art.

FIG. 20 shows a frame configuration chart of an embodiment using a bit for indicating a valid error report by the secondary station. FIG. 21 is a chart for explaining timing. In FIGS. 20 and 21, a bit 1001 for indicating a valid error report, a refresh request 1101 in which the bit for indicating the valid error report is turned on, and a reporting time 1102 of an error are illustrated. Other signs which are also in FIGS. 18 and 19 are same or equal elements with the signs in FIGS. 18 and 19.

With reference to FIGS. 20 and 21, explanations are made on operations of this apparatus.

Timing of the typical group 202 of the communications illustrated in FIG. 21 is explained. At first, the primary station 11 collects the refresh data for the secondary stations 13 and 14 of the output type and sends the data as the refresh request 1101 in which both of the bit 801 for indicating no need to respond and the bit 1001 for indicating the valid error report are turned on. The secondary stations 13 and 14 receive the refresh request 1101 for the own station and all the secondary stations by referring to the address 218, and checks the bit 801 for indicating no need to respond and the bit 1001 for indicating the valid error report in the received frame. Since both bits are valid, the refresh response is not sent. Only when an error is detected in monitoring from the own station, the error report is issued after receiving the refresh request 1101. For reporting the error, it is possible to send "1" for a constant time as defined in the HDLC.

Then, the primary station 11 checks if the error report is sent from the secondary station in the reporting time 1102 of the error after sending the refresh request. If there is an error report, the primary station 11 performs polling, and processes the retry transmission. The primary station 11 sends the polling request 213 to all the secondary stations of the input type. The secondary stations 12 and 15 read the polling data from the input circuit at the same time with receiving the polling request 213 for the own station and all the secondary stations by referring to the address 218. The transmission of the polling response is controlled as in the transmission of the refresh response stated in Embodiment 1.

The processor can know if there is an error in the secondary station of the output type by turning the bit 801 for indicating no need to respond off among the plurality of refresh requests.

As stated, according to this invention, the time for the communication can be reduced by notifying if there is a response from the secondary station and responding only in a necessary case based on the notice.

Further, since a field for showing that the normal response for the refresh request is not required is provided, the communication time can be further reduced.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. A system for sending and receiving serial data, comprising:
   a plurality of secondary stations each configured for receiving a refresh request and a synchronization request in a determined time, and for sending one of data and a response to a primary station; and
   the primary station configured for sending the refresh request and a polling request asking for sending data, and for retrying one of the polling request and the refresh request within the same determined time to all secondary stations from which the primary station failed to receive one of the data and the response, the primary station further configured for sending the synchronization request simultaneously to the plurality of secondary stations,
   where each of the plurality of secondary stations is designated as one of an input type or output type secondary station and wherein the refresh request is a request to an output type secondary station to output data external to the system, the output type secondary station being designated to output data from the system, where the synchronization request is a request to an input type secondary station to prepare data, and the polling request is a request to the input type secondary station to send data to the primary station, the input type secondary station being designated to prepare and input data to the primary station.

2. The system for sending and receiving the serial data of claim 1, wherein the primary station includes a retry number counter for counting one of a polling request retried and a refresh request retried, wherein retrying of one of the polling request and the refresh request is stopped after one of a determined number and determined time has passed.

3. The system for sending and receiving the serial data of claim 2, wherein the primary station includes a record corresponding to each of the secondary stations, wherein a retry flag is set, when a normal response is not received, wherein the retry flag remains in the record corresponding to each of the secondary stations after stopping retrying of one of the polling request and the refresh request.

4. The system for sending and receiving the serial data of claim 1, wherein the secondary station responds in a response frame of a compact type by using a flag code which is different from a flag code of the primary station.

5. The system for sending and receiving the serial data of claim 1, wherein the secondary station returns a busy response, when data for responding for the polling request from the primary station are failed to be prepared, wherein the primary station retries a polling request for the secondary station which has sent the busy response.

6. The system for sending and receiving the serial data of claim 1, wherein the primary station stores information on a type for each of the secondary stations, wherein the primary station skips sending the polling request in the determined time for the secondary station having failure to respond within the determined time.

7. The system for sending and receiving the serial data of claim 1, wherein the primary station stores information on a type for each of the secondary stations, wherein the primary station ignores data from the secondary station having failure to respond within the determined time.

8. The system for sending and receiving the serial data of claim 1, wherein the primary station stores an error state of each of the secondary stations, wherein the primary station sends an initialization request to the secondary station, when the secondary station in the error state returns to a normal response state.

9. The system for sending and receiving the serial data of claim 8, wherein the primary station stores information of a type for each of the secondary stations, wherein the primary station collects information of the secondary station before sending and compares the collected information with the information of the type before sending the initialization request.

10. The system for sending and receiving the serial data of claim 1, wherein one of the primary station and the secondary station sends a high level signal for a short period after sending a frame.

11. A system for sending and receiving serial data comprising:
a primary station configured for sending a refresh request and a polling request in a specific order without having each secondary station address in a determined time; and
a plurality of secondary stations for responding to the primary station, following to the specific order, where each of the plurality of secondary stations is designated as one of an input type or output type secondary station and where in the primary station is also configured to retry the refresh request and the polling request within the determined time to all of the plurality of secondary stations that failed to respond to the refresh request and the polling request, and where in the refresh request is a request to an output type secondary station to output data external to the system, the output type secondary station being designated to output data from the system and the polling request is a request to an input type secondary station to send data to the primary station, the input type secondary station being designated to prepare and input data to the primary station.

12. The system for sending and receiving the serial data of claim 11, wherein the secondary station has one of a counter and a timer monitoring a response from another secondary station and time, and makes a response of its own station after one of a respectively set order and time.

13. The system for sending and receiving the serial data of claim 12, wherein the secondary station has a monitoring responder for responding to the primary station in a determined order after the response time is passed in monitoring.

14. The system for sending and receiving the serial data of claim 11, wherein the primary station provides a field for showing that a normal response to the refresh request for the secondary station can be skipped, wherein the secondary station stops a normal refresh response based on the field.

15. The system for sending and receiving the serial data of claim 14, wherein the primary station provides a field for showing that an error report from the secondary station is possible in the refresh response, wherein the secondary station has a monitor for monitoring an error in an own station, wherein the secondary station returns an error response based on the field.

16. A method for sending and receiving serial data having a plurality of secondary stations each configured for receiving a refresh request and a synchronization request from a primary station and sending data to the primary station responding to a polling request, the method comprising:
simultaneously sending the synchronization request to the plurality of the secondary stations; where each of the plurality of secondary stations is designated as one of an input type or output type secondary station, and
retrying for sending one of the refresh request and the polling request to all of the plurality of secondary stations within a determined time which has not provided a normal response,
where in the refresh request is a request to an output type secondary station to output data external to the system, the output type secondary station being designated to output data from the system, where the synchronization request is a request to an input type secondary station to prepare data, and the polling request is a request to the input type secondary station to send data to the primary station, the input type secondary station being designated to prepare and input data to the primary station.

17. The method for sending and receiving the serial data of claim 16, wherein the primary station includes a retry number counter for counting one of the polling request retried and the refresh request retried, and wherein the primary station stops retrying for sending one of the refresh request and the polling request.

18. The method for sending and receiving the serial data of claim 16, further comprising:
responding in a response frame of a compact type from the secondary station by using a flag code, which is different from a flag code of the primary station.

19. The method for sending and receiving the serial data of claim 16, further comprising:
returning a busy response from the secondary station, when data for responding for the polling request from the primary station are failed to be prepared; and
retrying for sending a polling request from the primary station to the secondary station which has sent the busy response.

20. The method for sending and receiving the serial data of claim 16, further comprising:
storing information on a type for each of the secondary stations in the primary station; and
skipping sending the polling request in the determined time from the primary station to the secondary station having failure to respond within the determined time.

21. A system for sending and receiving serial data, comprising:
a plurality of secondary stations configured to send data in response to one of a refresh request and a polling request where each of the plurality of secondary stations is designated as one of an input type or output type secondary station; and
a master station operably connected to said secondary stations, said master station configured to perform first and second sequence determinations in a predetermined fixed period of time,
said master station determining the first sequence of responses by sequentially sending one of a refresh request and a polling request to each secondary station and recording a response from each secondary station,
said master station determining the second sequence of responses by sequentially sending one of the refresh request and the polling request to each of the plurality of secondary stations associated with an abnormal response in the first sequence of responses,
where in the refresh request is a request to an output type secondary station to output data external to said system, the output type secondary station being designated to output data from the system and the polling request is a request to an input type secondary station to send data to said master station, the input type secondary station being designated to prepare and input data to the primary station.

22. The system of claim 21, wherein:
each of the plurality of the secondary stations is configured to prepare the data in response to a synchronization request; and
the master station is configured to simultaneously send the synchronization request to the plurality of the secondary stations.

23. The system of claim 21, wherein the abnormal response includes a busy response and a time out.

24. A method for sending and receiving serial data, comprising:
determining a first sequence of responses by sequentially sending one of a refresh request and a polling request to each of a plurality of secondary stations and recording a response from each secondary station; and
determining a second sequence of responses by sequentially sending one of the refresh request and the polling request to each of the plurality of secondary stations associated with an abnormal response in the first sequence of responses,
where in the first and second sequences of responses are determined within a predetermined fixed period of time, and
where each of the plurality of secondary stations is designated as one of an input type or output type secondary station and wherein the refresh request is a request to an output type secondary station to output data external to said system, the output type secondary station being designated to output data from the system and the polling request is a request to an input type secondary station to send data to said master station, the input type secondary station being designated to prepare and input data to the primary station.

25. The system of claim 24, wherein:
simultaneously sending a synchronization request to the plurality of secondary stations; and
preparing data for each secondary station in response to the synchronization request.

26. The system of claim 24, wherein the abnormal response includes a busy response and a time out.

27. A system for sending and receiving serial data, comprising:
a plurality of secondary stations where each of the plurality of secondary stations is designated as one of an input type or output type secondary station and one or more input type secondary stations each configured for preparing data for transfer in response to a synchronization request from a primary station and configured for transferring the prepared data to the primary station in response to a polling request from the primary station;
one or more output type secondary stations each configured for preparing and transferring data externally from the system and sending an acknowledgement to the primary station in response to a refresh request from the primary station; and
the primary station configured for sending the synchronization requests to all input type secondary stations, sending refresh requests to all output type secondary stations, sending polling requests to all input type secondary stations, and receiving data from all input type secondary stations, all in a predetermined fixed period of time,
where in the primary station is also configured for detecting abnormal responses from the one or more input type secondary stations and from the one or more output type secondary stations and configured to retry the polling requests to abnormally responding input type secondary stations and the refresh requests to abnormally responding output type secondary stations, all within the predetermined fixed period of time.

28. The system of claim 27, wherein the primary station is configured for sending the synchronization requests to all input type secondary stations simultaneously.

29. The system of claim 28, wherein the primary station is configured for sending the polling requests to all input type secondary stations sequentially.

30. The system of claim 27, wherein the primary station is configured for sending the polling requests to all abnormally responding input type secondary stations sequentially.

31. The system of claim 28, wherein the primary station is configured for sending the refresh requests to all output type secondary stations sequentially.

32. The system of claim 27, wherein the primary station is configured for sending the refresh requests to all abnormally responding output type secondary stations sequentially.

33. The system of claim 27, wherein the primary station is configured for individualizing the refresh request for each output type secondary station.

34. The system of claim 33, wherein the primary station is configured for packaging individualized data that a particular output type secondary station outputs external to the system in the individualized refresh request.

* * * * *